(12) United States Patent
Jones et al.

(10) Patent No.: US 6,387,303 B1
(45) Date of Patent: *May 14, 2002

(54) METHOD FOR FORMING A SEAL BETWEEN MATING COMPONENTS

(75) Inventors: Barbara J. Jones, Davison; Edward Stanley Papciak, Novi; Michael John DeCello, Novi; Scott Louis Radabaugh, Novi, all of MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,309

(22) Filed: Mar. 26, 1999

Related U.S. Application Data

(63) Continuation-in-part of application No. 08/767,990, filed on Dec. 17, 1996, now abandoned.

(51) Int. Cl.[7] .............................................. B29C 45/14
(52) U.S. Cl. ..................... 264/40.1; 264/40.4; 264/263; 264/267; 264/46.6; 425/DIG. 47
(58) Field of Search ................................ 264/40.1, 263, 264/40.4, 40.5, 267, 46.6; 475/147, 149, DIG. 47

(56) References Cited

U.S. PATENT DOCUMENTS

| 2,893,058 | A | * | 7/1959 | Wurtz et al. | ..................... 18/42 |
| 4,043,727 | A | * | 8/1977 | Henzl | ........................... 425/578 |
| 4,161,380 | A | * | 7/1979 | Bishop | ........................ 425/145 |
| 5,065,768 | A | * | 11/1991 | Coleman et al. | ............. 128/760 |
| 5,116,558 | A | * | 5/1992 | Wrobel et al. | .............. 264/46.6 |
| 5,258,147 | A | * | 11/1993 | Yokota | ........................ 264/40.1 |
| 5,431,873 | A | * | 7/1995 | Vandenberghe | ............. 264/226 |
| 5,578,256 | A | * | 11/1996 | Austin | ........................ 264/40.1 |
| 5,686,032 | A | * | 11/1997 | Mizobe et al. | ............. 264/40.3 |

FOREIGN PATENT DOCUMENTS

DE 19632275 A 2/1998

* cited by examiner

*Primary Examiner*—Jan H. Silbaugh
*Assistant Examiner*—Edmund H. Lee
(74) *Attorney, Agent, or Firm*—Lorraine S. Melotik; William J. Coughlin; Raymond L. Coppielli

(57) ABSTRACT

There is disclosed a method for forming a gasket or seal between mating faces of two components. The method includes the steps of forming an initial seal and forming a primary seal by injecting a liquid material into a groove formed between the mated components. The method further includes the steps of monitoring sealant volume and injection pressure to determine whether a viable seal has been formed.

16 Claims, 3 Drawing Sheets

METHOD FOR FORMING A SEAL BETWEEN MATING COMPONENTS

This application is a continuation-in-part of U.S. patent application Ser. No. 08/767,990, filed Dec. 17, 1996, now abandoned.

BACKGROUND OF THE INVENTION

1. Field of the Invention

The present invention relates generally to forming gaskets in situ between mating components. More particularly, the present invention relates to forming gaskets or seals between mating components using liquid injection sealing.

2. Disclosure Information

It is well known in the automotive and machinery industries to use a preformed gasket between two mating components to prevent fluid from leaking from the assembly. Typically, the gasket is placed in a predefined location and the mating components are secured together. The gasket forms a compression seal between the components. It is also well known in the automotive and machinery industries to seal some assemblies with room temperature vulcanizer's (RTV) or anaerobic materials. RTV and anaerobic materials seal by adhering to the component parts.

It is also well known in the industry that if the gasket is misplaced or is not oriented correctly, or contains a tear, the gasket does not prevent leakage of fluid. One method of overcoming these potential situations is disclosed in U.S. Pat. No. 5,116,558. The '558 patent teaches that a gasket or seal may be formed in situ, that is, after the mating components have been assembled. The '558 patent teaches that one of the mating components includes a groove where the gasket or seal is to be formed. The mating components are assembled and a gasket-forming material is injected into the groove, where it polyermises to form the seal. The '558 patent specifically teaches the chemical compositions of various materials which can be used as such a seal.

However, the '558 patent does not address the problem of identifying whether the gasket or seal has been correctly formed between the mating components. The only way to know whether the seal is functional in the '558 patent is to either test the assembly, a long and tedious process, or to disassemble the assembly and look at the seal, thus destroying the seal between the components. It would be advantageous to provide some means for identifying whether the seal formed in situ is functional without destroying the seal or testing the assembly.

It is an object of the present invention to provide a method for forming a gasket or seal between mating components which is much less sensitive to manufacturing variability than current seals.

It is a further object of the present invention to provide a method for forming a gasket or seal between mating components which identifies whether a functional seal has been formed.

It is an object of the present invention to provide a method for forming a gasket or seal between mating components that is much easier to replace during "in-field" repairs than current adhesive seals.

SUMMARY OF THE INVENTION

The present invention overcomes the problems associated with the prior art by providing a method for forming a seal between two mating components having a fluid contained therebetween, each of the components having a mating face, the method comprising the steps of forming a groove in at least one of the mating faces of one of the mating components and forming an inlet port in fluid communication with the groove. The components are mated together in a face-to-face relationship so as to define a flange area adjacent the groove and a liquid gasket-forming material is provided. The method further includes the steps of forming an initial seal between the mating components in the flange area by injecting a predetermined volume of liquid gasket-forming material at a predetermined pressure into the groove and measuring the injection pressure of the liquid gasket-forming material as the material is being injected into the groove. The method also includes the steps of stopping the injection of the liquid gasket-forming material when the injection pressure reaches a predetermined value, and forming a primary seal between the mating components by curing the liquid gasket-material in the groove to form the seal between the mating components.

It is an advantage of the present invention that a seal may be formed between two components in an automated process at significantly reduced cost than other known processes.

It is a further advantage of the present invention that a viable seal is formed between two components which functions by a combination of perfect fit, flash formation, minimal shrinkage of the sealant material, and seal material swelling and expansion caused by absorption of the fluid being sealed.

It is an advantage of the present invention that a viable seal is formed over a wide range of surface finishes of the two components.

These and other objects, features and advantages of the present invention will become apparent from the drawings, detailed description and claims that follow.

DETAILED DESCRIPTION OF THE PREFERRED EMBODIMENTS

Figure 1:
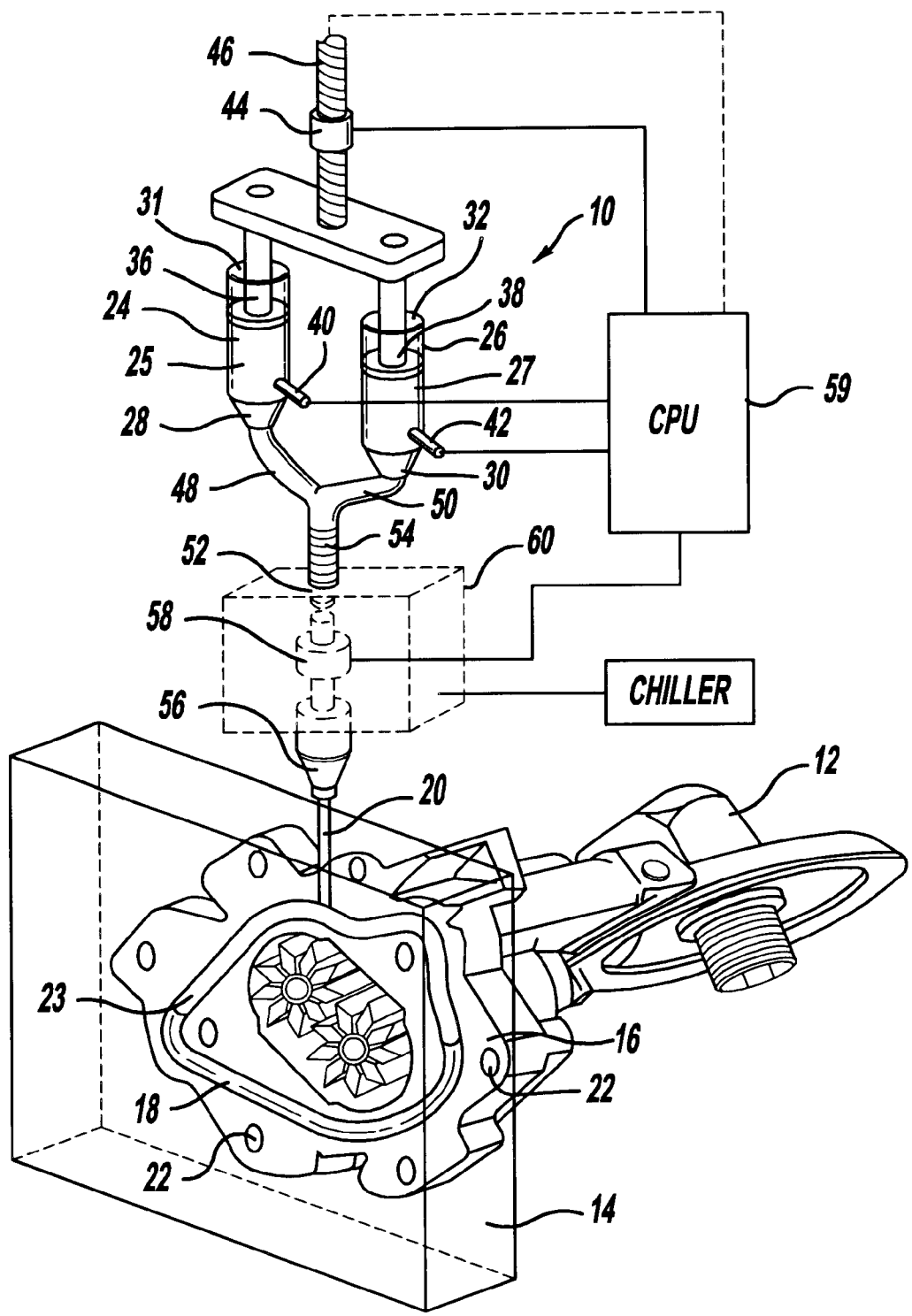
FIG. 1 is a perspective view of an apparatus for forming a seal in accordance with the principles of the present invention.

Referring now to the drawings, FIG. 1 shows a liquid injection sealing apparatus 10 which can be used for forming a variety of different seals or gaskets, and as shown, is fabricating a seal between an oil pump 12 and an engine block 14. In this environment, the oil pump contains a fluid, oil, and the seal formed with the method of the present invention operates to prevent leakage of this fluid from between the oil pump and the engine. As such, this is an example of the seal operating in an environment of a particular fluid. The present invention can be used in a variety of other, non-automotive applications as well, especially where a static compression seal is needed between two components, such as in the machine industry, wherein the components contain a fluid and the seal is exposed to the fluid. Typically, when two components are joined together and a fluid is contained within a cavity formed by the components, a quantity of the fluid will flow between the mating surfaces of the components. If a seal is not present, the fluid will leak out. If a seal is present, the fluid will flow as far as the seal and stop. Often, the fluid will contact the seal. Although the present invention is being described with reference to automotive applications, the present invention is not meant to be limited to such applications. As used herein, the terms "seal" or "gasket" are used interchangeably.

As shown in FIG. 1, one face 16 of the oil pump 12 is secured to a mating face (not shown) on the engine block (represented by 14) by fasteners 22. The face 16 of the oil pump includes a groove 18 and an inlet port 20 in which the seal 23 is formed and as will be described in greater detail below.

The liquid injection sealing apparatus 10 for forming a gasket or seal between mating components includes a pair of syringe-like, material receiving cylinders 24, 26, each having an orifice 28, 30, respectively at one end and a generally open end 31, 32 respectively, at the opposite end thereof. The cylinders 24, 26 contain a volume of generally fluid materials therein, these materials, when mixed together, form a gasket-forming material. The apparatus 10 is shown as having two separate cylinders 24, 26, but the present invention contemplates that a single cylinder may be used as well.

In the preferred embodiment, one cylinder 24 includes a base material 25 while the second cylinder 26 includes a catalyst material 27. When the base and catalyst materials are combined, they form a sealing compound that can be injected into a groove between mating components. Examples of materials that can be used are liquid silicone rubbers, such as ER07005A&B, available from Wacker Silicone Corporation in Adrian, Mich. Other examples of materials that can be used are found in U.S. Pat. No. 5,116,558, the disclosure of which is hereby incorporated by reference. The apparatus 10 of the present invention can be used for any single, two-part or multiple part synthetic polymeric materials such as liquid rubbers.

The injection apparatus 10 further includes a pair of positive displacement rams 36, 38 disposed in cylinders 24, 26, respectively. The rams 36, 38 reciprocate within the cylinders to contact the materials therein and force the materials through their respective orifices 28, 30. In operation, the cylinders 24, 26 are filled either by air-operated bucket pumps or cartridges. Other known devices can be used to fill the cylinders also. To fill the cylinder, an inlet valve (not shown) to each cylinder is opened and the rams 36, 38 are retracted to draw the materials into the cylinders. During refill, the material pressure is monitored by pressure sensors 40, 42 in the cylinders or on the rams to insure that the pressure does not drop below a preset minimum. This is done for two reasons: first, if the cylinder pressure is negative, a potential exists for pulling air into the cylinder past the ram seals. Secondly, if the buckets or cartridges run out of material, they will not be able to supply the pressure to fill the cylinders and the machine 10 will stop due to low cylinder inlet pressure. Examples of pressure sensors 40, 42 that can be used are made by Sensotec of Columbus, Ohio.

Once the cylinders 24, 26 are full, the inlet valves shut and the rams 36, 38 are run forward (or down) with the orifices 28, 30 closed. This has two effects: first, it brings the cylinders up to a preset pressure prior to the injecting process which minimizes the volume measurement errors due to compressibility in the material. Second, the distance that the rams move and the change in pressure are used to measure air in the material. If air is present, steps can be taken to purge the cylinder(s) and resume normal operations.

As further shown in FIG. 1, each of the rams 36, 38 is connected to a volume sensor 44. Volume sensing is done by measuring the positive displacement of the rams on the threaded rod 46 as the rams 36, 38 push the material 25, 27, respectively, through the orifices 28, 30. By measuring the distance the rams travel through the number of revolutions of threaded rod 46, and knowing the diameter of the rams, a volume of material can be determined. As shown in FIG. 1, the rams 36, 38 travel in coincidence, but the present invention contemplates that independent travel can easily be arranged.

As the rams 36, 38 push the materials of the cylinders 24, 26, the materials flow through the orifices 28, 30, through a pair of conduits 48, 50 and into a mixing tube 52. The mixing tube 52 is generally cylindrical and includes a static mixing member 54 which causes the two materials to mix together. The mixing tube combines the base and catalyst materials into a viscous, gasket-forming compound that is injected through a nozzle 56 into the inlet port 20 of the assembly. Another pressure sensor 58 is disposed between the mixing tube 52 and the nozzle 56 which measures the pressure of the gasket-forming compound as it is being injected into the assembly. The pressure sensors 40, 42 on each cylinder, pressure sensor 58 and the volume sensor 44 are each connected to a central processing unit such as a microprocessor 59. The microprocessor 59 receives signals from these sensors and determines whether the seal is viable as will be explained below. The microprocessor can include a visual display terminal that is capable of giving a visual or audio warning to an operator.

The apparatus 10 may further include a chiller, shown schematically in FIG. 1 at 60. The chiller 60 lowers the temperature of the gasket-forming compound found in the mixing tube 54 and the nozzle 56. As is widely known, the combination of a base material and a gasket material into a gasket-forming compound typically polymerizes into a hardenable material quickly at room temperature. If the machine 10 of the present invention is left unattended and not used, the gasket-forming compound could harden within the nozzle, preventing further injection of material through it. This necessitates either replacing or cleaning the nozzle, an expensive option. By providing a chiller to decrease the temperature of the compound within the nozzle, polymerization does not take place until the compound is in the groove of the assembly, thus saving time and money. A typical chiller to cool the nozzle is made by Neslabs Instruments, which has offices in Plainfield, Ill. This type of chiller is a recirculating chiller with an antifreeze solution that cools the nozzle to 0 degrees Celsius or less to slow the reaction time from a few minutes to almost sixty minutes.

Figure 2:
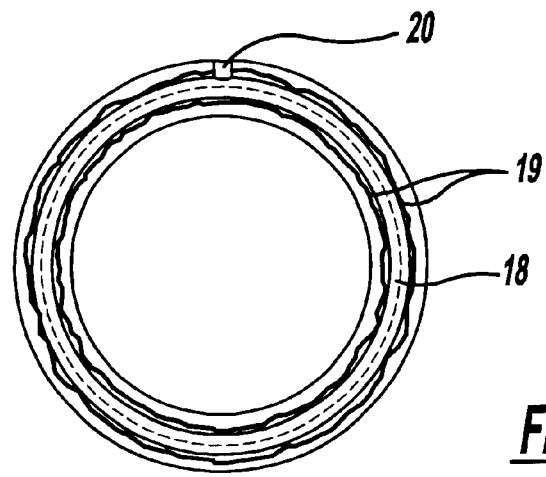
FIG. 2 is an elevational view of a component having a groove structured in accordance with the principles of the present invention.

As described briefly earlier, one or both of the mating faces to be joined includes a groove 18. As shown in FIG. 2, the groove may be cast in the part, or machined. The groove 18 typically is formed only in one face, but may be formed in both. The surface roughness of the groove itself is not a design issue as it may be in prior art gaskets. In general, within reason, the rougher the groove the better to provide increased surface area for the seal to join. A normal production die-cast finish works well. The groove should not contain any cracks, breaks or severe porosity in the continuity of the groove as these will result in an incomplete filling due to the material exiting the groove through such a break. An ideal groove design includes a half-round bottom and no sharp edges.

Figure 3A:
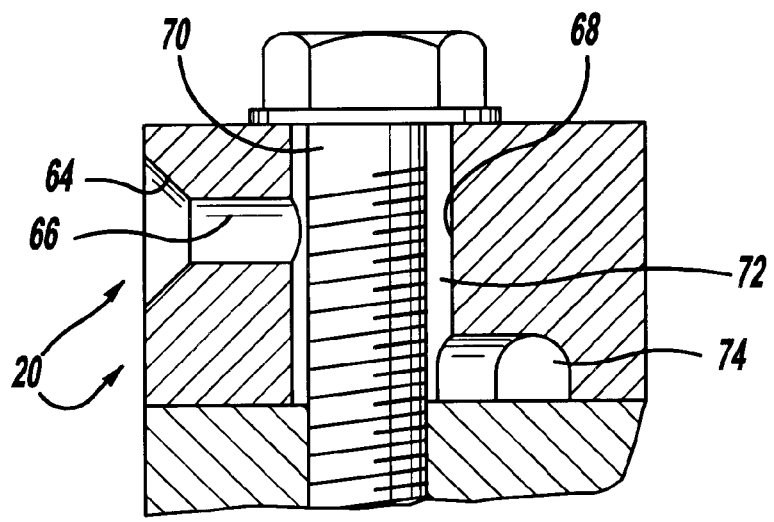
FIGS. 3A and 3B are enlarged, cross-sectional views of inlet ports used in the process of the present invention.
Figure 3B:
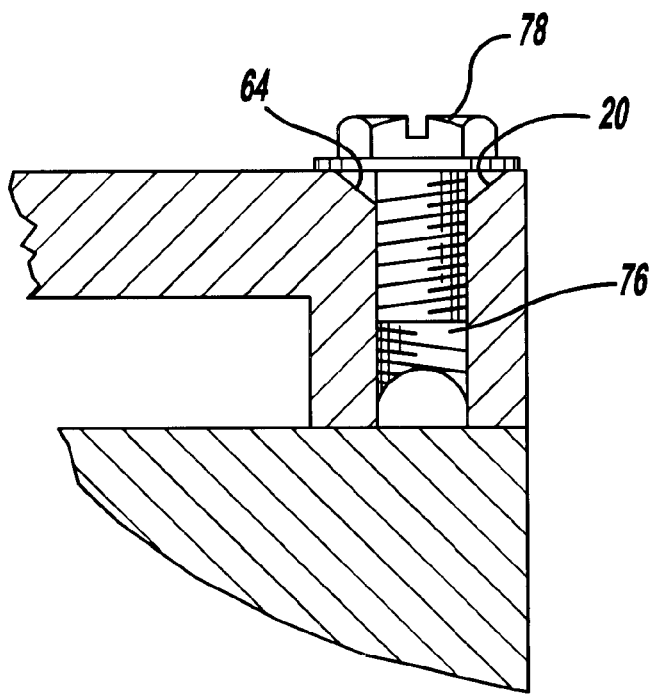

FIGS. 3A and 3B show alternative designs for inlet or injection ports 20. The inlet port 20 provides the inlet path for the sealant material and prevents extrusion of the seal out of the port. This occurs when the seal 23 attempts to push back out the inlet port 20 due to the internal pressure generated by the thermal expansion of the seal. When the seal pushes, or extrudes, back through the injection port 20, it tears itself and fails. The injection port 20 must allow the nozzle 56 to seal against the assembly while injecting. Typically a conical shaped port entrance 64 with a spherical nylon injection tip can be used. Two different types of inlet ports are shown: FIG. 3A shows a constrained port while FIG. 3B shows a plugged port. The ideal port location is one where the port could be cast in so that it only needs to be cleaned out with a drill and not machined in completely. It should also be in a location where it is accessible for both injection in the plant and re-injection after servicing of the assembly in the field.

The constrained port 66 of FIG. 3A provides restriction to prevent the seal from extruding back through the port when the assembly heats up in service. The preferred design for accomplishing this requires that the inlet port 66 run through a fastener column 68 so that the material wraps around the fastener 70 in the clearance volume 72 between the fastener 70 and the hole 68, and then proceeds into the groove 74 on the far side of the fastener. Other open port configurations can be used as well.

The plugged port 76 shown in FIG. 3B uses a self tapping screw 78 or other plug-like device that is inserted into the port 76 immediately after the seal material is injected. In this design, the port can be placed almost anywhere and does not need to be restrictive.

The method of the present invention will now be described. The first step in the method is to provide a predetermined surface finish on either or both of the mating components. The surface finish of the mating components should have a surface roughness, as measured by $R_A$, of between 20 and 500 (microinches per inch). With this surface roughness, air can escape between the mating faces as will be described below. It is contemplated that the mating surface of one of the components could have a mirror-like surface if the surface finish of the second component was sufficiently rough as to allow the air displaced during the present method to escape. It is also important that the groove 18 be reasonably clean and dry prior to injection. Standing fluid present in the groove will be pushed ahead of the sealant material and create a dam as the two streams of sealant material meet. This prevents the seal from joining and results in an incomplete seal. However, a light film of fluid in the groove will not affect joining of the streams and formation of a complete film. For example, a rag-wiped part can be successfully injected provided there is no standing fluid in the groove. This provides the benefit that special cleaning processes are not needed for a successful injection, resulting in a more efficient, lower cost process.

After the groove 18 and inlet ports are formed, the mating components to be assembled are secured together. A flange area 19 (FIG. 2) is formed by the mating components on either or both sides of the groove 18. The flange area is the area between the exterior edges of the components and one edge of the groove as well as the area between the interior cavity of the mated component (which contain a fluid) and the other edge of the groove.

The nozzle 56 of the liquid injection sealing machine 10 is placed in the inlet port and the rams 36, 38 push the base and catalyst materials into the mixing tube 52. The mixing tube 52 combines the materials into the sealant or gasket forming compound which is then forced through the nozzle 56. Injection pressure and volume (or amount of material) are monitored and the injection is complete when either the injection pressure reaches a preset shut-off pressure or the maximum volume (amount) limit of material is reached. The rams 36, 38 are then stopped, the nozzle is closed and pulled away from the assembly. If necessary the inlet port is plugged. At this point the cylinders begin refilling. While being injected, the sealant material typically flows in two directions in the groove, meeting at one point.

Once the streams of sealant material have joined, an initial seal is formed when a thin film of sealant material forces itself out of groove 18 and into the flange areas 19, on either or both sides of the groove between the two mating components, forming a flash. Air displaced by the sealant material during injection of the groove escapes through the flange areas of the mating components because sufficient space is formed by the surface roughness of the mated components. A secondary port is not required to exhaust the air from the groove during injection. However, if both mating components have a surface finish $R_A$ of less than 20, a second port would be necessary to exhaust the air displaced in the groove. The initial seal formed by the flash operates to prevent a flow of the fluid contained within the cavity formed by the mating components from between the components. The fluid will contact the flash prior to contacting a primary seal formed by the material in the groove.

The method of the present invention insures that a viable seal is formed. By measuring both injection pressure and sealant volume dispensed, it can be determined whether the seal is viable. The sealant material is injected at a predetermined rate while monitoring both volume and injection pressure at the nozzle 56. When the groove is filled completely, the injection pressure rises rapidly until a preset limit is reached. When that pressure limit is reached, injection is stopped. The maximum and minimum pressure limits are preset to ensure formation of a sufficient amount of flash between the two mating components. It has been determined that a sufficient amount of flash can extend over 100% of the flange area (along the entire length of the groove), although flash covering approximately 1%–10% of the flange areas works as well. The flash is required for initial sealing of the fully assembled part by the cured sealing material. Flash formation is dependent on injection pressure, injection time and surface roughness of the mating components. It is contemplated that flash formation may also be effected by controlling the rate of rise of injection pressure after the two streams of sealing material have joined, or by shutting off the injection nozzle after a preset time period when a predetermined pressure limit is reached.

The apparatus 10 checks the volume (or amount dispensed) of material against preset maximum and minimum limits. If the volume injected is within the prescribed limits, the seal is considered viable. If the maximum volume is achieved before the pressure limit is reached, the apparatus assumes a leak is present and injection is stopped. The seal is considered not viable. A signal to an operator, such as a flashing light or warning sound can be given. It is further contemplated that volume and pressure settings will be matched to the surface finish of the two components to provide sufficient flash formation for sealing. If the apparatus 10 shuts-off based on the injection pressure, but the volume injected is below the volume minimum, then either a blocked groove or a plugged mixer is causing the excessive injection pressure and the seal is considered not viable. Again, a warning can be given to an operator. The operator can remove the part for repair or scrap, or otherwise identify it for later repair.

It is contemplated that the assembly containing the non-viable seal could also be automatically diverted for repair, based upon an electronic signal from the injection apparatus. As the cured sealing material does not adhere to the surface of the mating components, unlike anaerobics and RTV, its removal and replacement can easily be achieved after disassembly of the mating components. The parts can then be reassembled and re-injected by the apparatus. It is further contemplated that the apparatus could electronically signal an automated marking unit if a non-viable seal was made. The automated marking unit would then inscribe a physical mark on the assembled part, identifying it as containing a non-viable seal. An example of an automated marking unit is made by Technifor, which has offices in Farmington Hills, Mich.

Figure 4:
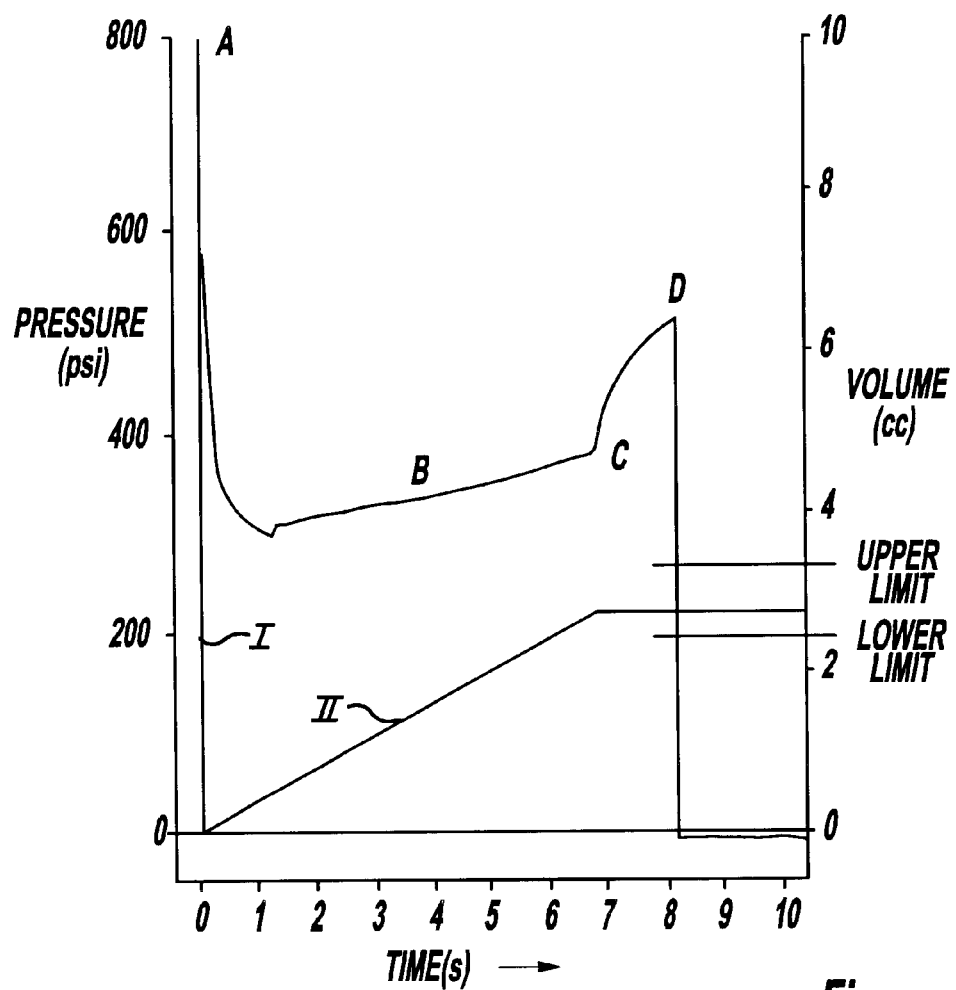
FIG. 4 is a graphic representation of an injection pressure versus time plot for the process of the present invention.

FIG. 4 graphically shows the injection control strategy of the present invention. FIG. 4 plots injection pressure versus time on Line I and sealant volume injected versus time at Line II. As can be seen in Line I, at point A, a pressure spike from the nozzle first opening is shown. This spike quickly falls off, then the pressure slowly rises as the groove fills (point B). At point C, a rapid pressure rise begins when the groove is full. When this pressure reaches the preset shutoff limit, or attains a predetermined rate of rise (point D), either based on time or time after a certain point is reached, the nozzle is closed. Line II gradually rises over time as the volume of sealant is injected into the groove. The upper and lower volume limits are shown, and as explained above, the injected volume must be between these limits for a seal to be considered viable.

The present invention further contemplates that the change in pressure over time, dp/dt can be measured during injection. By measuring this change, the nozzle could be shut off when this change reached a preset limit, or when a specific rate-of-rise in pressure is attained. For example, change in pressure over time greatly increases at point C versus point B. This would allow stopping the injection at a point to ensure sufficient flash has been formed. The nozzle may also be shut off after a preset time period after reaching a predetermined pressure. For example, 0.5 seconds after reaching point C.

The seal formed by the cured sealing material is not like a prior art compression gasket as there is no initial compressive load by the mating components on the seal. The seal formed by the cured sealing material is also not like a prior art RTV or anaerobic as it does not require adhesion to the mating components for sealing to occur. It is unlike a foam as the cured sealing material is solid and contains no air bubbles or void volume. There is minimal shrinkage of the cured material.

As described above, the flash formed between the two mating components during injection of the sealing material provides the initial sealing properties of the gasket. Subsequent sealing properties of the primary seal are provided through absorption of the fluid being sealed by the sealing material as the fluid contained in the cavity contacts the seal. Absorption of fluid will cause expansion of the seal material; as there is no void volume for the sealant material to flow into pressure will be exerted uniformly in all directions on the component parts by the seal, thereby preventing fluid escape. Thermal cycling of the sealed part additionally will enhance fluid absorption by the sealing material. Sealing material with a coefficient-of-expansion greater than the mating parts is contemplated by the method of the present invention. When the sealed part is used in a heated environment, thermal coefficient-of-expansion of the material will further enhance the sealing properties of the material.

Unlike a conventional compression gasket, sealing of an assembly by the cured sealing material will not be affected by compression set relaxation as there is uniform pressure exerted through the cross-section of the primary seal and there is no void volume for the seal to relax into.

Many other variations and modifications will no doubt occur to those skilled in the art. It is the following claims, including all equivalents, which define the scope of the invention.

What is claimed is:

1. A method for forming a viable seal comprised of initial and primary seals at an interface between two mating components defining a fluid containing cavity therebetween, each of the components having a mating face, comprising the steps of:

forming a groove in the mating face of at least one of the mating components and forming an inlet port in fluid communication with the groove;

providing at least one of the mating faces with a predetermined surface finish;

securing the components together with the mating faces in a face-to-face contacting relationship to form a flange area at an interface between the mating faces and extending from an edge of the groove to an edge of the mating faces;

providing a liquid gasket-forming material;

forming the initial seal between the secured components in the flange area adjacent the edge of and along an entire length of the groove by injecting the liquid gasket-forming material at a predetermined pressure through the inlet port into the groove, to overflow the groove and fill the flange area with a flash portion of the injected liquid gasket-forming material the mating face with the predetermined surface finish having a surface roughness sufficient to permit air to escape from the groove and through the flange area to the edge of the mating faces and to permit a portion of the injected liquid gasket-forming material to flow from the groove into the flange area along the edge of the groove to form the initial seal;

measuring an injection pressure of the liquid gasket-forming material as the material is being injected into the groove;

stopping the injection of the liquid gasket-forming material when the injection pressure reaches a predetermined value; and forming the primary seal between the secured components by curing the injected liquid gasket material in the groove to prevent leaking of fluid in the cavity from between the secured components.

2. The method according to claim 1 wherein the initial seal is formed over at least approximately 1%–10% of the flange area and along an entire length of the groove.

3. The method according to claim 1 wherein the step of providing a liquid gasket-forming material includes providing a liquid gasket-forming material operative to absorb a fluid contained in the cavity of said components and swell in response to the absorption of the fluid.

4. The method according to claim 3 wherein the absorption of the fluid by the liquid gasket-forming material is enhanced by thermal cycling.

5. The method according to claim 1 wherein the step of forming the initial seal further includes a step of injecting the liquid gasket-forming material through the inlet port and into the groove so that a first stream and a second stream of the liquid gasket-forming material flow in two generally opposite directions in said groove until the first and second streams meet.

6. The method according to claim 1 wherein the predetermined surface roughness has an $R_A$ value of between 20–500 microinches per inch.

7. The method according to claim 1 wherein the liquid gasket-forming material has a coefficient-of-expansion greater than a coefficient-of-expansion of each of the mating components.

8. The method according to claim 1 further including a step of measuring a volume amount of liquid gasket-forming material injected into the groove during the step of forming the initial seal.

9. The method according to claim 8 further including a step of stopping the injection of the liquid gasket-forming material if the measured volume of the liquid gasket-forming material exceeds a predetermined maximum value.

10. The method according to claim 8 further including a step of comparing the measured volume of the injected liquid gasket-forming material to a predetermined value and signaling an operator if the measured volume deviates from a predetermined volume by a value greater than or less than a predetermined limit.

11. The method according to claim 1 wherein the step of measuring the injection pressure of the liquid gasket-forming material further includes a step of measuring a rate of change of the injection pressure of the liquid gasket-forming material over a predetermined amount of time.

12. The method according to claim 11 further including a step of stopping the injection of the liquid gasket-forming material if the rate of change of the injection pressure over the predetermined amount of time exceeds a predetermined value.

13. The method according to claim 8 further including a step of signaling an operator when the measured volume of material injected into the groove is below a predetermined value and the injection pressure is within predetermined limits.

14. A method for forming a viable seal comprised of initial and primary seals between two mating components defining a fluid containing cavity therebetween, each of the components having a mating face, comprising the steps of:

preparing the mating faces of the components to have a predetermined surface roughness sufficient to allow air to pass between the mating faces of the components when the mating faces are secured together in face-to-face contacting relationship;

forming a groove in the mating face of at least one of the components and forming an inlet port in fluid communication with the groove;

securing the components with the mating faces in a face-to-face contacting relationship so as to define a flange area at an interface between the mating faces;

providing a liquid gasket-forming material;

forming the initial seal between the components in the flange area by injecting the liquid gasket-forming material at a predetermined pressure into the groove and causing the injected liquid gasket-forming material to overflow the groove and fill at least a portion of the flange area extending from an edge of the groove with a flash portion of the injected liquid gasket-forming material;

measuring a rate of change of injection pressure of the liquid gasket-forming material as the material is being injected into the groove over a predetermined amount of time, and stopping the injection of liquid gasket-forming material when the rate of change of the injection pressure over the predetermined amount of time exceeds a predetermined value;

measuring a volume of the liquid gasket-forming material being injected into the groove and comparing the measured volume to a predetermined value and signaling an operator when the measured volume deviates from the predetermined volume by a value greater than a predetermined limit; and forming the primary seal between the mating components by curing the liquid gasket-forming material in the groove to prevent leaking of fluid in the cavity from between the secured components.

15. The method according to claim 14 wherein the predetermined surface roughness has an $R_A$ value of between 20–500 microinches per inch.

16. The method according to claim 14 further including a step of signaling an operator when the measured volume is below the predetermined value and the rate of change of injection pressure over the predetermined amount of time is within predetermined limits.

* * * * *